US008554409B2

(12) United States Patent
Kalkkuhl et al.

(10) Patent No.: US 8,554,409 B2
(45) Date of Patent: Oct. 8, 2013

(54) METHOD FOR INFLUENCING THE TRANSVERSE DYNAMICS OF A VEHICLE

(75) Inventors: Jens Kalkkuhl, Holzgerlingen (DE); Daniel Keppler, Althengstett (DE); Magnus Rau, Kirchheim unter Teck (DE); Avshalom Suissa, Althengstett (DE)

(73) Assignee: Daimler AG, Stuttgart (DE)

( * ) Notice: Subject to any disclaimer, the term of this patent is extended or adjusted under 35 U.S.C. 154(b) by 397 days.

(21) Appl. No.: 12/937,186

(22) PCT Filed: Jan. 27, 2009

(86) PCT No.: PCT/EP2009/000503
§ 371 (c)(1),
(2), (4) Date: Dec. 17, 2010

(87) PCT Pub. No.: WO2009/124614
PCT Pub. Date: Oct. 15, 2009

(65) Prior Publication Data
US 2011/0112722 A1 May 12, 2011

(30) Foreign Application Priority Data

Apr. 9, 2008 (DE) .......................... 10 2008 017 950

(51) Int. Cl.
*G06F 17/00* (2006.01)
*B62D 6/04* (2006.01)
*B62D 5/04* (2006.01)
*B60T 8/24* (2006.01)

(52) U.S. Cl.
USPC ................... 701/38; 701/41; 701/48; 701/70; 340/440; 180/282

(58) Field of Classification Search
USPC ............. 701/1, 36, 37, 38, 41, 43, 48, 70, 71, 701/72, 82; 340/438, 440; 180/271, 282
See application file for complete search history.

(56) References Cited

U.S. PATENT DOCUMENTS

| 6,615,124 B1 | 9/2003 | Adachi |
| 2005/0256622 A1 | 11/2005 | Futterer et al. |
| 2008/0015754 A1 | 1/2008 | Hac |

FOREIGN PATENT DOCUMENTS

| DE | 100 16 343 A1 | 10/2000 |
| DE | 102 26 683 A1 | 12/2003 |

(Continued)

OTHER PUBLICATIONS

International Search Report with partial translation and PCT/ISA/237 dated May 6, 2009 (fourteen (14) pages).

(Continued)

*Primary Examiner* — Thomas Tarcza
*Assistant Examiner* — Edward Pipala
(74) *Attorney, Agent, or Firm* — Crowell & Moring LLP

(57) ABSTRACT

In a method for influencing the transverse dynamics of a vehicle, a transverse dynamics disturbance variable acting on the vehicle is detected by a disturbance variable determination device and a counter-yaw moment counteracting the transverse dynamics disturbance variable is produced. For this purpose, the dynamic transverse dynamics disturbance variable is detected by the disturbance variable determination device, and a first counter-yaw moment is produced to compensate at least partially for the dynamic transverse dynamics disturbance variable with the help of a first vehicle system. The first counter-yaw moment is reduced following the at least partial compensation, and with the help of the disturbance variable determination device, a check is made whether a stationary transverse dynamics disturbance variable exists. If so, a second counter-yaw moment is produced with the help of a second vehicle system to at least partially compensate for the stationary transverse dynamics disturbance variable.

10 Claims, 2 Drawing Sheets

(56) References Cited

FOREIGN PATENT DOCUMENTS

| | | |
|---|---|---|
| DE | 102 36 331 A1 | 2/2004 |
| DE | 10 2004 017 638 A1 | 10/2005 |
| DE | 10 2004 057 928 A1 | 6/2006 |
| EP | 0 473 112 A2 | 3/1992 |
| JP | 2006-282063 A | 10/2006 |
| WO | WO 2006/058702 A1 | 6/2006 |

OTHER PUBLICATIONS

Japanese Notification of Reason for Refusal with English translation dated Nov. 21, 2012 (five (5) pages).

METHOD FOR INFLUENCING THE TRANSVERSE DYNAMICS OF A VEHICLE

BACKGROUND AND SUMMARY OF THE INVENTION

This application is a national stage of PCT International Application No. PCT/EP2009/000503, filed Jan. 27, 2009, which claims priority under 35 U.S.C. §119 to German Patent Application No. 10 2008 017 950.7, filed Apr. 9, 2008, the entire disclosure of which is herein expressly incorporated by reference.

The invention relates to a method for influencing the transverse dynamics of a vehicle.

German patent document DE 102 36 331 A1 discloses a generic method for operating a vehicle steering system which can generate a steering angle by means of an actuator, for compensating a disturbance yaw moment independently of a steering angle preset by the driver of the vehicle with the steering wheel. If the actuator fails, the following steps are carried out after initiating a steering angle that compensates a disturbance yaw moment (which remains with a failed actuator): an actuator yaw moment generated by the actuator is calculated, and a compensating counter-yaw moment is slowly built up by automatic application of a longitudinal wheel force, in order to enable the driver to counteract a steering angle to this yaw moment. Subsequently, the counter-yaw moment is reduced slowly in order to enable the driver to balance the yaw moment occurring due to the steering angle still present by means of a steering angle generated by the steering wheel.

German patent document DE 10 2004 017 638 A1 discloses a method and apparatus for a vehicle for determining at least one side wind value. The latter is estimated by means of a transverse acceleration value and a yaw rate value based on a vehicle model. The transverse acceleration value and of the yaw rate value can be detected, for example, by specially formed transverse acceleration sensors or yaw rate sensors. The vehicle model can for example be a linearized transverse dynamics one-track model.

Finally, a method for side wind stabilization of a motor vehicle is known from German patent document DE 10 2004 057 928 A1, in which a side wind magnitude is estimated, which reflects a side wind influence exerted on the vehicle. For compensating the effect of the side wind on the vehicle, the transverse dynamics of the vehicle are adjusted dependent on the estimated side wind magnitude. For this purpose, wheel contact forces acting on the wheels thereof are modified, namely in such a manner that the side wind influence exerted on the vehicle can be compensated.

One object of the present invention is to provide an alternative or improved method of the generic type, which offers particularly good compensation of side wind influences acting on a vehicle.

This and other objects and advantages are achieved by the invention which is based on the general idea to at least partially compensate the dynamic and the stationary part of a transverse dynamics disturbance variable of a transverse disturbance acting on a vehicle, in particular a side wind. The method according to the invention uses two vehicle systems for this, with the help of which counter-yaw moments can be generated for the at least partial compensation of the transverse dynamics disturbance variable. The method according to the invention thereby uses the following method steps in principle:

The dynamic part of the transverse dynamics disturbance variable is first detected by a disturbance variable determination device, and a first counter-yaw moment is then effected with the help of a first vehicle system for the at least partial compensation of the dynamic transverse dynamics disturbance variable.

Subsequently, the first counter-yaw moment is reduced or removed after the at least partial compensation. It is then checked, with the help of the disturbance variable determination device, whether a stationary transverse dynamics disturbance value is present as a stationary part of the transverse dynamics disturbance variable, and if so, a second counter-yaw moment is generated with the help of a second vehicle system for the at least partial compensation of the stationary transverse dynamics disturbance variable. It is thus possible by means of the method according to the invention to support the driver with the at least partial compensation of the dynamic part and with the at least partial compensation of the stationary part of the transverse dynamics disturbance variable—for example of a disturbance yaw moment.

The dynamic transverse dynamics disturbance variable is effectively compensated at least partially with a low reaction time by a first vehicle system (for example, a wheel brake intervention), while the at least partial compensating of the stationary transverse dynamics disturbance variable takes place by a second vehicle system (for example, a steering system). The generation of the second counter-yaw moment can thereby take place by a second vehicle system, whose comfort is larger for the driver when generating the second counter-yaw moment than the comfort when generating the first counter-yaw moment by the first vehicle system, as the second counter-yaw moment is often needed for a considerably longer time compared to the first counter-yaw moment.

By means of the method according to the invention, it is possible to choose the second vehicle system in such a manner that the comfort requirements are fulfilled. However, in order to be able to react to the dynamic part in a sufficiently fast and effective manner with a high dynamics, the dynamic transverse dynamics disturbance variable is counteracted by the first counter-yaw moment, which is generated by the first vehicle system and which has to fulfill distinctly lower comfort requirements and which can be optimized with regard to the build-up dynamics of the first counter-yaw moment with a detected dynamic transverse dynamics disturbance variable.

The first counter-yaw moment is advantageously generated at one of the wheels by a wheel brake intervention for the at least partial compensation of the dynamic transverse dynamics disturbance variable. A first counter-yaw moment can be built up by the brake system or a wheel brake intervention in a particularly dynamic and fast manner.

In an advantageous further development of the invention, the second counter-yaw moment is used for the at least partial compensation of the stationary transverse dynamics disturbance variable with the help of a second vehicle system, whose activation is influence-free with regard to the longitudinal vehicle speed, whereby a sufficiently high driving comfort can be ensured during the generation of the second counter-yaw moment.

In particular, the steering system can be used as second vehicle system, wherein a steering moment is generated in particular with the help of a steering moment adjuster, which supports the driver when generating the second counter-yaw moment. E.g. the driver does not continuously have to apply a hand moment to the steering wheel but is supported or completely relieved by the steering moment adjuster. The steering moment adjuster can be designed in a manner that can be accessed very easily as an electric motor and thus be operated electrically. The steering moment applied to the steering system, in particular a steering column, by the steering moment adjuster can be perceived by the driver at the steering wheel.

The driver can thereby first be supported by the steering torque adjusted with the at least partial compensation of the stationary transverse dynamics disturbance variable, while the compensation of the dynamic transverse dynamics disturbance variable takes place only via the wheel brake intervention, so that a sufficiently high dynamics and simultaneously a high driving comfort is achieved for generating the second counter-yaw moment.

It is advantageous if the disturbance variable determination device detects the dynamic transverse dynamics disturbance variable in that a side wind magnitude is estimated by means of a transverse acceleration value and/or a yaw rate value on the basis of a vehicle model and in particular a disturbance observer. A simple and safe detection of side wind influences is possible thereby. It is additionally advantageous if the stationary transverse dynamics disturbance variable is detected, in which, after the detection or the at least partial compensation of the dynamic transverse dynamics disturbance variable, a steering angle and/or a steering wheel angle and/or a hand moment applied to the steering wheel and/or a variable correlating with the mentioned variables is evaluated. In this manner, the stationary transverse dynamics disturbance variable can be determined in a simple and safe manner. A transverse dynamics variable such as a transverse acceleration and/or a yaw speed can for example be used as correlating variable.

The above-mentioned characteristics which will be explained in detail hereinafter can be used not only in the respectively given combination but also in other combinations or on their own without exceeding the scope of the present invention.

Other objects, advantages and novel features of the present invention will become apparent from the following detailed description of the invention when considered in conjunction with the accompanying drawings.

DETAILED DESCRIPTION OF THE INVENTION

Figure 1:
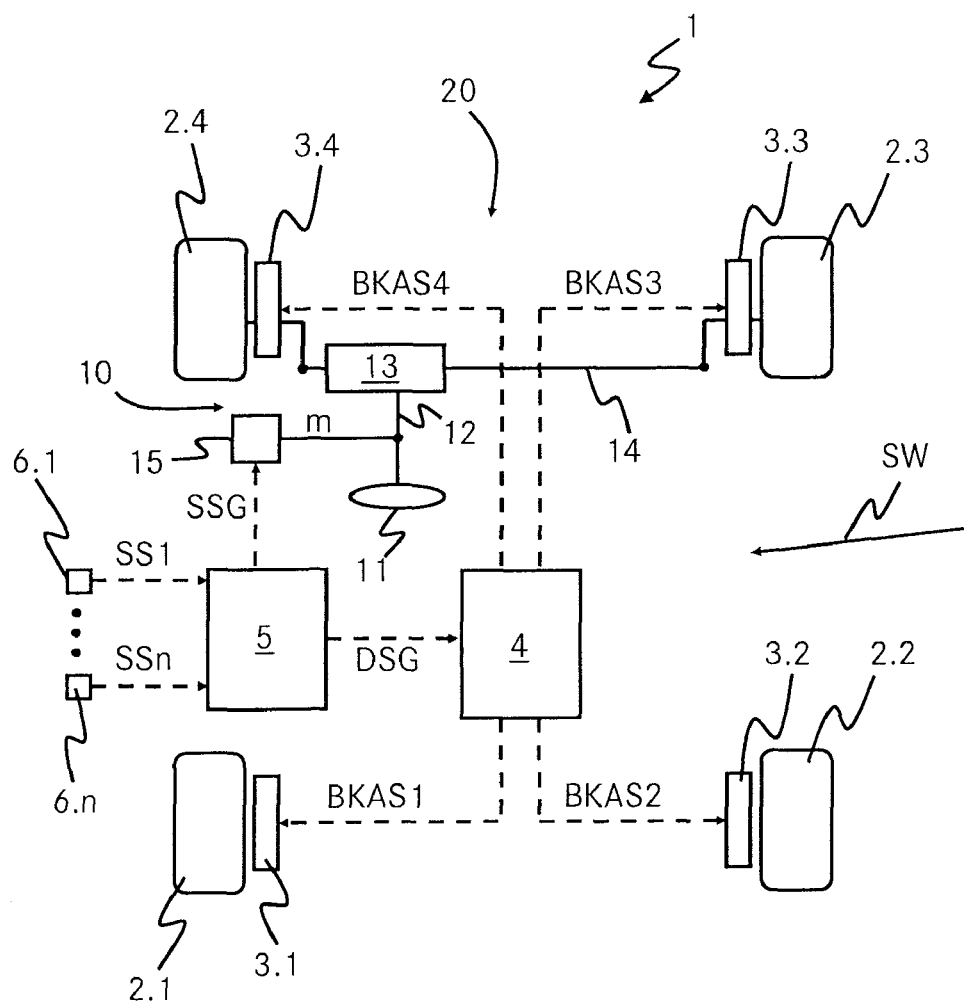
FIG. 1 is a schematic depiction of a motor vehicle with an arrangement of the device according to the invention.

FIG. 1 is a schematic depiction of a vehicle with an arrangement of a device 20 for carrying out a method for influencing the transverse dynamics of the vehicle. The vehicle 1—for example a motor vehicle—has four wheels 2.1-2.4, which are respectively in operative connection with an associated wheel brake unit 3.1-3.4. Each of the wheel brake units 3.1-3.4 is formed for braking the wheel 2.1-2.4 of the vehicle 1 respectively associated therewith and can be accessed individually independently of the respective other wheel brake units. Brake forces with different strengths or brake actions can thereby be achieved at the individual wheels 2.1-2.4. A corresponding actuation of one of the wheel brake unit with 2.1-2.4 can thus also be called "wheel brake intervention". For activating the wheel brake units 3.1-3.4, a brake force activation unit 4 is provided according to the invention, via which the wheel brake units 3.1-3.4 can be accessed or activated and deactivated. The brake force activation device 4 is in a signal-technical connection with a disturbance variable determination device 5 on its part. A number of sensors 6.1-6.n supplies sensor signals SS1-SSn to the disturbance variable determination device 5. The disturbance variable determination device 5 presently has a disturbance variable observer.

The vehicle 1 has a steering system 10, whose steering wheel 11 is connected to a steering transmission 13 via a steering column 12. The steering transmission converts the rotary movement at the steering wheel 11 or the steering column 12 to a translational movement, which serves for adjusting the steering angle at the steerable wheels 2.3 and 2.4 via a steering link 14. For supporting the driver during steering, a steering moment adjuster 15 is provided, which is for example coupled to the steering column 12 and which alternatively could also be coupled to the steering transmission 13. The steering moment adjuster 15 applies a steering moment m to the steering column 12, which can also be perceived at the steering wheel 11 due to the mechanical connection and serves as servo support for the driver. The steering moment adjuster 15 is also in a signal-technical operative connection with the disturbance variable determination device 5.

The sensors 6.1-6.n serve for determining one or more actual variables of the vehicle 1, such as a yaw rate, a longitudinal speed, a steering angle, the steering wheel angle, the hand moment at the steering wheel 11 applied by the driver and/or a transverse acceleration. Corresponding sensor signals SS1-SSn are transmitted by the sensors 6.1-6.n to the disturbance determination device 5.

The disturbance determination device 5 determines a dynamic transverse dynamics disturbance variable of the vehicle from the actual variables of the vehicle 1, in a known manner as is explained in detail, for example, in the German patent application 10 2004 017 638. In this manner, the disturbance determination device 5 can in particular be used for determining the dynamic disturbance effect of the side wind SW acting on the vehicle 1 or on its vehicle body and the influencing of the vehicle transverse dynamics caused thereby. The German patent application 10 2004 017 638 is insofar referred to expressly.

The disturbance variable determination device 5 can generate a dynamic disturbance variable signal DGS, which is transferred to the brake force activation device 4, and the disturbance determination device 5 can generate a stationary disturbance variable signal SSG, which is transferred to the steering moment adjuster 15. If a dynamic transverse dynamics disturbance variable Sy,dyn is detected by the disturbance variable determination device 5, it is transferred to the brake force activation device 4 by the dynamic disturbance variable signal DGS, which then activates at least one of the wheel brake units 3.1-3.4 by means of corresponding brake force activation signals BKASS1-BKASS4. If a stationary transverse dynamics disturbance variable Sy,stat is detected by the disturbance variable determination device, it is transferred to the steering moment adjuster 15 by the stationary disturbance variable signal SGS, which then generates a steering moment m for supporting the driver when counter-steering against the stationary transverse dynamics disturbance, as e.g., a side wind.

The wheel brake intervention is basically carried out at least at one wheel 2.1, 2.4 or 2.2, 2.3 of one vehicle side, in order to generate a counter-yaw moment counteracting the transverse disturbance. In order to design the wheel brake intervention as comfortable as possible for the driver, only, or at least in a first brake intervention step, the corresponding non-steerable wheel 2.1 or 2.2 at the rear axle of the vehicle can be braked, so that possibly perceivable repercussions at the steering wheel of the vehicle 1 remain as small as possible. How strong possible repercussions are with the wheel-individual braking of a steerable wheel depends on the vehicle type and its chassis design. It is adapted individually to the vehicle type, if the wheel brake intervention takes place at the steerable wheel 2.3 or 2.4 and/or at a non-steerable wheel 2.1 or 2.2. With vehicle types where only small repercussions take place at the steering wheel during the braking of a steerable wheel 2.3 or 2.4, the steerable wheel 2.3 or 2.4 of the same vehicle side can thereby also be braked alternatively or additionally to the non-steerable rear wheel 2.1 or 2.2 for compensating transverse disturbances.

It is thus possible to design the wheel brake intervention in such a manner that the wheels 2.1, 2.4 or 2.2, 2.3 of one vehicle side are braked simultaneously. The brake force distribution between the steerable front wheel 2.3 or 2.4 and rear wheel 2.2 or 2.1 on this vehicle side can be preset in dependence on the vehicle and/or be adjusted depending on the drive situation. The brake force distribution between the steerable front wheel 2.3 or 2.4 and the non-steerable rear wheel 2.2 or 2.1 can for example depend on parameters as the amount of the transverse dynamics disturbance variable, the steering angle, the longitudinal speed, the transverse acceleration, the yaw rate, or other longitudinal and transverse dynamic vehicle state variables.

The dynamic disturbance of the transverse dynamics due to an occurring side wind SW is compensated at least partially by the wheel brake intervention. The disturbance variable determination device 5 and/or the brake force activation device 4 is formed for this purpose to determine a necessary brake force at a wheel or several wheels 2.1-2.4 of the vehicle 1 by means of a suitable method or model, in order to correspondingly—as has already been mentioned—to compensate for the occurred dynamic disturbance of the vehicle transverse dynamics.

By means of FIG. 2, an example of the method according to the invention is explained in detail in the following.

Figure 2:
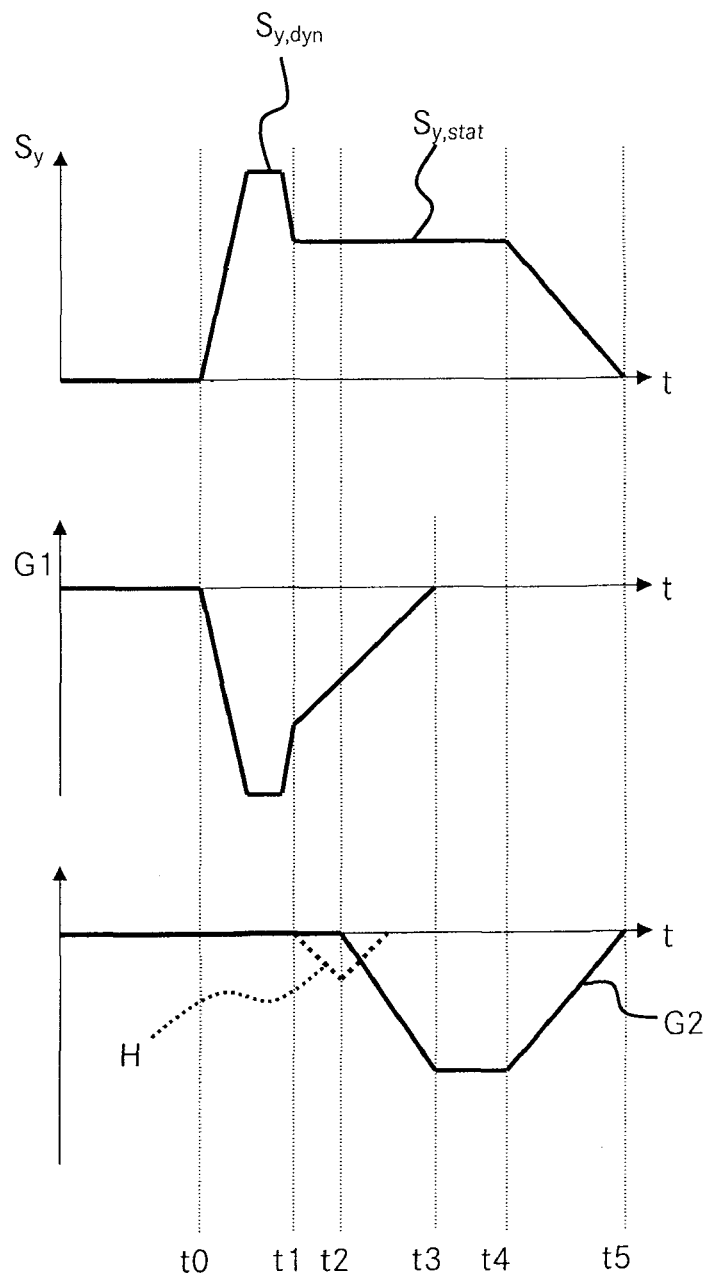
FIG. 2 schematically depicts the temporal course of a transverse dynamics disturbance variable of a first counter-yaw moment and a second counter-yaw moment, according to an embodiment of the method according to the invention.

FIG. 2 shows the exemplary temporal course of the compensation of a dynamic transverse dynamics disturbance variable Sy,dyn and a stationary transverse dynamics disturbance variable Sy,stat in a schematic depiction. In FIG. 2, the time t is plotted on the abscissa of the three depictions. The upper diagram shows the transverse dynamics disturbance variable Sy composed of the dynamic transverse dynamics disturbance variable Sy,dyn and the stationary transverse dynamics disturbance variable Sy,stat, the center diagram shows the first counter-yaw moment G1 and the lower diagram shows the second counter-yaw moment G2 and the hand moment H at the steering wheel 11.

The method according to the invention for influencing the transverse dynamics of a vehicle with a disturbance acting in the transverse direction functions as follows:

At a first time t0, transverse forces act on the vehicle body of the vehicle, for example caused by a side wind, and thus generate a transverse dynamics disturbance variable Sy and in particular a disturbance yaw moment, which is estimated by the disturbance variable determination device 5 on the basis of the sensor data SS1 to SSn. As can be seen in FIG. 2, the estimated transverse dynamics disturbance variable Sy changes very quickly from the first time t0 to a second time t1, as can for example be seen from the temporal derivation of the transverse dynamics disturbance variable Sy and the comparison of the temporal derivation with a threshold value. This part of the transverse dynamics disturbance variable Sy changing quickly depicts the dynamic transverse dynamics disturbance variable Sy,dyn. The difference between the transverse dynamics disturbance variable Sy and the dynamic transverse dynamics disturbance variable Sy,dyn forms the stationary transverse dynamics disturbance variable Sy,stat. The stationary transverse dynamics disturbance variable Sy,stat is thus the slowly changing part of the transverse dynamics disturbance variable Sy whose temporal derivation of the threshold value is not exceeded.

For compensating the dynamic transverse dynamics disturbance variable Sy,dyn, a first counter-yaw moment G1 acting against the dynamic transverse dynamics disturbance variable Sy,dyn is generated by a first vehicle system and for example by the brake system of the vehicle. The opposite direction of the first counter-yaw moment G1 with regard to the dynamic transverse dynamics disturbance variable Sy,dyn is shown in FIG. 2 in that the first counter-yaw moment G1 has a different prefix than the dynamic transverse dynamics disturbance variable Sy,dyn. In the preferred embodiment, the respective rear wheel 2.1 or 2.2 is braked via the associated wheel brake device 3.1 or 3.2, in order to generate the first counter-yaw moment G1, depending from which direction the transverse dynamics disturbance acts on the vehicle 1.

At the second time t1, the reduction of the first counter moment G1 is started by the removal of the brake pressure at the corresponding wheel brake device 3.1 or 3.2, so that the first counter-yaw moment G1 is removed slowly, preferably in a linear manner.

From the second time t1, the driver of the vehicle starts to compensate for the stationary transverse dynamics disturbance variable Sy,stat by a hand moment to be applied at the steering wheel 11. The stationary transverse dynamics disturbance variable Sy,stat is detected by the disturbance variable determination device 5 in that the driver applies a hand moment H during the removal or reduction of the first counter-yaw moment G1. The disturbance variable determination device 5 detects for example the stationary transverse dynamics disturbance variable Sy,stat at a third time t2 and activates a second vehicle system for generating a second counter-yaw moment G2.

At the third time t3, the steering moment adjuster 15 is activated with the preferred embodiment, which then generates a continuously increasing second counter-yaw moment G2 for compensating the stationary transverse dynamics disturbance variable Sy,stat as can be seen in FIG. 2. In the same measure as the second counter-yaw moment G2 generated by the steering moment adjuster 15 increases, the hand moment H to be applied by the driver at the steering wheel 11 decreases, wherein the sum of the steering moment m and of the hand moment H brings about the necessary second counter-yaw moment G2 at any time.

At a fourth time t3, the first counter-yaw moment G1 is removed completely, so that the entire necessary counter-yaw moment is only provided through the second counter-yaw moment G2 from this time onwards.

From a fifth time t4, the stationary transverse dynamics disturbance variable Sy,stat and the second counter-yaw moment G2 are reduced correspondingly by reducing the steering moment generated by the steering moment adjuster 15. At a sixth time t5, the transverse dynamics disturbance variable Sy and the two counter-yaw moments G1, G2 are again reduced to zero.

The dynamic transverse dynamics disturbance variable Sy,dyn can be detected by the above-mentioned disturbance variable determination device 5, in that it for example estimates a side wind magnitude and derives a side wind influence exerted thereon on the vehicle. The stationary transverse dynamics disturbance variable Sy,stat is detected by the disturbance variable determination device 5, in that for example the steering angle and/or the steering wheel angle and/or the hand moment H and/or a variable correlating therewith are evaluated. Such a correlating variable is for example a transverse acceleration and/or a yaw speed of the vehicle.

It can generally be achieved with the method according to the invention that the driver of the vehicle 1 is only supported actively by the steering moment adjuster 15 during the at least partial compensation of the stationary part of the transverse dynamics disturbance variable Sy, while the at least partial compensation of the dynamic part of the transverse dynamics disturbance variable Sy is carried out solely via a wheel brake intervention. This offers the great advantage that the driver of the vehicle 1 is not irritated by a steering moment that is applied suddenly during the compensation of the dynamic part of the transverse dynamics disturbance variable Sy,stat. The dynamic transverse dynamics disturbance variable Sy,dyn is effectively compensated by a wheel brake intervention with a low reaction time, while the compensating of the stationary transverse dynamics disturbance variable Sy,stat is actively supported by a steering moment applied to the steering system 10 by a steering moment adjuster 15. The driving safety and the driving comfort are ensured in this manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for influencing the transverse dynamics of a vehicle, wherein a transverse dynamics disturbance variable acting on the vehicle, is detected by a disturbance variable determination device, and a counter-yaw moment counteracting the transverse dynamics disturbance variable is produced, said method comprising:
the disturbance variable determination device detecting the dynamic transverse dynamics disturbance variable;
a first vehicle system producing a first counter-yaw moment for at least partially compensating for the dynamic transverse dynamics disturbance variable;
reducing the first counter-yaw moment following the at least partial compensation for the dynamic transverse dynamics disturbance variable;
the disturbance variable determination device checking whether a stationary transverse dynamics disturbance variable exists; and
a second vehicle system generating a second counter-yaw moment to at least partially compensate for the stationary transverse dynamics disturbance variable if a stationary transverse dynamics disturbance variable was detected, wherein the second vehicle system generates the second counter-yaw moment to at least partially compensate for the stationary transverse dynamics disturbance variable after the first vehicle system begins reducing the first counter-yaw moment following the at least partial compensation for the dynamic transverse dynamics disturbance variable.

2. The method according to claim 1, wherein:
the first counter-yaw moment for at least partial compensation of the dynamic transverse dynamics disturbance variable is generated by a wheel brake intervention at one of the wheels.

3. The method according to claim 1 wherein:
the second counter-yaw moment for the at least partial compensation of the stationary transverse dynamics disturbance variable is generated by the second vehicle system, whose activation is influence-free on the longitudinal vehicle speed.

4. The method according to claim 3, wherein:
a vehicle steering system is used as the second vehicle system; and
a steering moment is generated in particular with the help of a steering moment adjuster, which supports the driver when generating the second counter-yaw moment.

5. The method according to claim 4, wherein:
the steering moment adjuster is operated electrically.

6. The method according to claim 4 wherein:
a steering moment applied by the steering moment adjuster to the vehicle steering system can be perceived at the steering wheel by the driver.

7. The method according to claim 4 wherein:
the first counter-yaw moment for at least partial compensation of the dynamic transverse dynamics disturbance variable is generated by a wheel brake intervention at one of the wheels; and
the driver is actively supported only by the steering moment adjuster during the at least partial compensation of the stationary transverse dynamics disturbance variable; and
compensation of the dynamic transverse dynamics disturbance variable takes place solely via wheel brake intervention.

8. The method according to claim 1 wherein:
the disturbance variable determination device detects the dynamic transverse dynamics disturbance variable, in that a side wind magnitude is estimated based on at least one of a transverse acceleration value and a yaw rate value, and based on a vehicle model and a disturbance observer.

9. The method according to claim 1 wherein:
the stationary transverse dynamics disturbance variable is detected, in which, after the detection and the at least partial compensation of the dynamic transverse dynamics disturbance variable, at least one of a steering angle, a steering wheel angle, a hand moment applied to the steering wheel, and a variable correlating with the mentioned variables is evaluated.

10. The method according to claim 9, wherein:
a transverse dynamic magnitude is used as correlating variable.

* * * * *